(12) United States Patent
Wilnau

(10) Patent No.: US 7,296,816 B2
(45) Date of Patent: Nov. 20, 2007

(54) EQUIPMENT TRANSPORT SYSTEM AND KIT

(75) Inventor: James R. Wilnau, Virginia Beach, VA (US)

(73) Assignee: Mule Transport Systems, LLC, Norfolk, VA (US)

( * ) Notice: Subject to any disclaimer, the term of this patent is extended or adjusted under 35 U.S.C. 154(b) by 248 days.

(21) Appl. No.: 11/104,262

(22) Filed: Apr. 12, 2005

(65) Prior Publication Data

US 2005/0225046 A1    Oct. 13, 2005

Related U.S. Application Data

(60) Provisional application No. 60/561,814, filed on Apr. 13, 2004.

(51) Int. Cl.
*B60P 3/10* (2006.01)
(52) U.S. Cl. .............. 280/414.2; 280/47.131; 280/47.331
(58) Field of Classification Search .......... 280/414.1, 280/414.2, 480, 656, 47.131, 47.17, 47.331; 114/344
See application file for complete search history.

(56) References Cited

U.S. PATENT DOCUMENTS

| | | | |
|---|---|---|---|
| 2,670,969 A * | 3/1954 | Costikyan | .............. 410/51 |
| 3,339,607 A | 9/1967 | Howard | |
| 3,687,476 A | 8/1972 | Abbott | |
| 4,029,327 A | 6/1977 | Kolstein | |
| 4,369,982 A * | 1/1983 | Hein et al. | .............. 280/47.131 |
| 4,544,172 A | 10/1985 | Poulouin | |
| 4,602,802 A | 7/1986 | Morgan | |
| 4,712,803 A | 12/1987 | Garcia | |
| 4,733,905 A | 3/1988 | Buickerood et al. | |
| 4,793,535 A | 12/1988 | Johnson | |
| 4,795,178 A | 1/1989 | Nabarrete | |
| 4,804,025 A | 2/1989 | Bear | |
| 4,852,895 A | 8/1989 | Moffitt | |
| 4,934,719 A * | 6/1990 | duPont | .............. 280/47.131 |
| 5,014,955 A | 5/1991 | Thompson | |
| 5,104,017 A * | 4/1992 | Vandagriff | .............. 224/609 |
| 5,107,995 A | 4/1992 | Simpson | |
| 5,163,550 A | 11/1992 | Hawk | |

(Continued)

FOREIGN PATENT DOCUMENTS

GB    2211159 A  *  6/1989

*Primary Examiner*—Christopher Bottorff
(74) *Attorney, Agent, or Firm*—Williams Mullen; M. Bruce Harper

(57) ABSTRACT

A lightweight equipment transport kit and system for transporting rigid items having a wheel assembly (20); a head piece (70) defining an enclosure for insertion of the front end of the equipment (50); a tail piece (10) defining an enclosure for insertion and support of the rear end of the equipment (50), and further having a mount or axle sleeve (12) for bearing the wheel assembly in a substantially transverse orientation to a direction of transportation, and wherein the wheel assembly (20) supports the tail piece (10); and a tensioner (26) capable of fastening to the head piece (70), fastening to the tail piece (10) or the wheel assembly (20) mounted on tail piece (10), and creating a tension between so as to seat the front end of the equipment (50) within head piece (70) and the rear end of the equipment within the tail piece (10). The equipment transport system is adaptable for manual towing, vehicular towing, and mounting onto an automobile roof rack.

12 Claims, 7 Drawing Sheets

U.S. PATENT DOCUMENTS

| | | | |
|---|---|---|---|
| 5,176,394 A * | 1/1993 | Veazey | 280/414.2 |
| 5,203,580 A * | 4/1993 | Cunningham | 280/47.331 |
| 5,207,441 A | 5/1993 | Granbery | |
| 5,348,327 A * | 9/1994 | Gieske | 280/47.331 |
| 5,364,112 A * | 11/1994 | Jackson | 280/30 |
| 5,492,254 A * | 2/1996 | Challoner et al. | 224/586 |
| 5,573,259 A | 11/1996 | Casatillo | |
| 5,791,279 A | 8/1998 | Hart | |
| 5,823,551 A | 10/1998 | Conroy | |
| 5,871,220 A * | 2/1999 | Lombard | 280/79.7 |
| 6,003,883 A * | 12/1999 | Brenneman | 280/30 |
| 6,189,900 B1 * | 2/2001 | MacDonald | 280/47.331 |
| 6,230,951 B1 * | 5/2001 | Anderson | 224/585 |
| 6,270,092 B2 * | 8/2001 | Darling, III | 280/30 |
| 6,364,336 B1 | 4/2002 | Jenkins | |
| D476,476 S | 7/2003 | Hansen | |
| 6,799,707 B2 * | 10/2004 | Gibson | 224/609 |
| 2001/0052686 A1 | 12/2001 | Galik | |

\* cited by examiner

EQUIPMENT TRANSPORT SYSTEM AND KIT

CROSS REFERENCE TO RELATED APPLICATIONS

The present application claims priority from U.S. Provisional Application Ser. No. 60/561,814, filed Apr. 13, 2004.

FIELD OF THE INVENTION

The present invention is generally related to a kit and a system for transporting items. More particularly, the invention is directed to a lightweight transport system that may be provided in kit form, and when assembled may be towed manually or by separate vehicle, and is adapted for mounting onto an automobile roof rack.

BACKGROUND OF THE INVENTION

Dollies, trailers, wagons, hand trucks, wheeled platforms, etc., are all generally used to move objects. Examples of these devices are common in warehouse or shipping environments. Although they are useful for their customary applications, they may be unsuitable for use in other transporting activities. For example, many sports use unwieldy pieces of equipment such as surf boards, snowboards, kayaks, canoes, or windsurfing boards that are not amenable to transportation by generally available dollies or trailers. Moving such equipment to the location of intended use can be difficult. In another example, a massive hand truck may not be available for transporting lumber at a remote building site. The structure, bulk, or weight of a transporting device can interfere with the activity itself. For example, upon reaching a destination for kayaking, the question arises as to what to do with the transporting device. Disassembly and portage of common transporters is typically impractical.

By way of example, a surfer who lives some distance from a beach may face limited transportation choices. First, the surfer may lift and carry a surf board to the beach, which can be difficult given a board's weight, its tendency to catch the wind, and the potential distance involved. Secondly, the surfer could load the board onto an automobile or golf cart. If the beach does not allow parking, or if the surfer does not own these vehicles, then the surfer may not have this choice. Third, the surfer may seek out a device that aids in transporting the board to the beach, such as a sling to help carry the board, or a dolly or trailer to make the board more mobile. Of course, the heavier the equipment, as with kayaks or canoes, the more severe the problem. This situation is also common to non-sporting equipment such as coolers, lumber, umbrellas, etc.

Clearly, a device that bears even some of the weight of such equipment, while improving its mobility (without otherwise harming its performance) would be valuable. However, as mentioned above, the structure required in many existing approaches introduces problems of weight, transportability of the transporting device itself, and manageability in use. On the other hand, some lightweight transporters can be unstable or limited in the weight born. Aids or systems for transporting equipment fall into several exemplary categories.

A first category of such systems are carriers or slings that aid in carrying equipment. Typically, these devices are directed to relocating and/or redistributing the load of the equipment, so as to enable the person to move while carrying the equipment. For example, U.S. Pat. No. 4,804,025 to Bear disclosed a padded carrying harness or pouch for surf boards with a spreader bar that creates an inverted V-shape in a shoulder strap to improve load distribution, comfort, and control. Except for the spreader bar, much of the pouch could be fabricated from lightweight material. However, the person must still carry the full weight of the equipment and the harness for the distance involved; further, winds could still exert difficult to manage forces on the board.

Some carriers seek to improve the manageability of awkward equipment. For example, U.S. Pat. No. 5,492,254 to Challoner disclosed a carrier case for smaller recreational boards. This design uses a flat base for the equipment, straps and pouches to hold the equipment to the base, and at least one shoulder strap for carrying. This carrier is envisioned to operate as a backpack, which might improve handling over a sling in windy conditions; however, this invention is unsuitable for larger equipment, such as surfboards, kayaks, or windsurfing boards, which are not easily carried on the back without inhibiting motion, or throwing the carrying individual off balance. This device also relies on the person's ability to carry the full weight of the equipment and carrier case.

Some transporters bear some of the weight of the equipment, typically by positioning wheels underneath the equipment. These structures are often configured so that wheels bear the weight under one end while the individual leads or pulls the equipment by the other. For example, U.S. Pat. No. 4,602,802 comprises a sail board dolly where a U-shaped frame with wheels supports the board and a strap of other means holds the board in place. The individual may then pull the equipment by a strap situated at the end of the board opposite the wheels. The rigid frame in this design carries some inherent weight and bulk, which affects its portability and ease of use. Another example of a dolly is U.S. Pat. No. 4,712,803 to Garcia. This dolly is a collapsible frame with wheels. A sailboard may rest within a crotch of the frame. The frame is fashioned of lightweight tubing, configured in a structure that can be collapsed using a scissors-like movement. The collapsible nature of this dolly is an improvement over the rigid structure described above; however, even when collapsed, this invention still presents weight and bulk that can be inconvenient. These two examples are also limited to specific equipment.

U.S. Pat. No. 5,573,259 to Castillo reveals a bicycle trailer with an elongated support member running from a bicycle attachment point to at least one wheel that carries the weight of the equipment. The equipment rests either in rigid racks or in a utility bag supported by the elongated member. This design involves considerable framework, with its attendant weight and bulk. As intended, this framework may be suitable for bicycle transport, but could inhibit personal use without a bicycle.

A combination dolly and trailer is disclosed in U.S. Pat. No. 5,348,327 to Gieske. This invention involves a tube with wheels (or wheel assemblies), having a cylindrical foam pad on which a sail or surf boards may rest. Two strap assemblies loop about the axle at each end and are kept from sliding on the axle by hook and loop tape. The two strap assemblies buckle together over the board to hold it in place; in addition, one of the assemblies provides a coupling strap (and buckle) that runs longitudinally toward the front of the board. Placed at the front, underneath the board is a padded tubular T-member that is used for pulling and steering the equipment. The user grips the trunk or base of the T-member, while the arms are used for stabilization. A strap runs through the arms of the tubular T in the form of a loop. The padded T-member, being situated under the board, is held to the board by a loop formed by the front strap, when tightened. The front strap connects to the rear strap via front-to-rear coupling strap that runs longitudinally toward the end of the board. Tension on the front-to-rear strap, combined with the weight of the equipment, is intended to keep the parts in proper orientation. This invention represents an advance over earlier designs, in that it could potentially reduce the weight of the transporter. When disassembled, the individual parts may take up less space than preceding designs. However, the various elements rely primarily on the tension of strap loops around the equipment for rigidity. Further, this design requires the consistent weight of the equipment to maintain orientation. If the load were to shift or bounce, then rigidity could be adversely affected. Transverse or steering forces are communicated to the device via straps. When an individual might seek to change direction on a resisting surface, such as a sandy beach, then the force on the T-member might loosen its strap and rigidity could be lost.

It is an object of the present invention to provide a lightweight equipment transport system and kit containing the components of the transport system.

It is an object of the present invention to provide a secure system while minimizing the rigid structure within the transport system.

It is an object of the present invention to provide a cost effective and portable equipment transport system or kit that may be used manually, towed by a vehicle, or mounted onto a roof rack of an automobile.

SUMMARY OF THE INVENTION

An equipment transport system or kit in accordance with the present invention includes a wheel assembly, a tensioner, a front or head piece, and a rear or tail piece. The head and tail pieces each have enclosures or pockets for insertion of the front and rear ends of rigid equipment. Preferably, the head and tail pieces will be composed of a durable, pliable fabric. The tensioner operates to seat the equipment within the enclosures or pockets by effecting a tension between the front piece and the rear pieces. The tail piece is adapted to mount detachably the wheel assembly, such that the structure formed by the equipment, the two pieces, the tensioner, and the wheel assembly may be manually transported by lifting the head piece and allowing the weight of the equipment to rest on the wheel assembly via the tail piece. Preferably, the tensioner may also provide support to the wheel assembly.

The head piece may include a handle to aid in manual towing, or an adapter to attach to a vehicle for vehicular towing.

The head and tail pieces may also be adapted for mounting onto an automobile rack. Preferably, the mount on the tail piece by which the wheel assembly is mounted may also be used in mounting the transport system onto an automobile roof rack.

The transport system may be easily assembled or disassembled, so as to be amenable for sale and carrying in a kit form.

Figure 1:
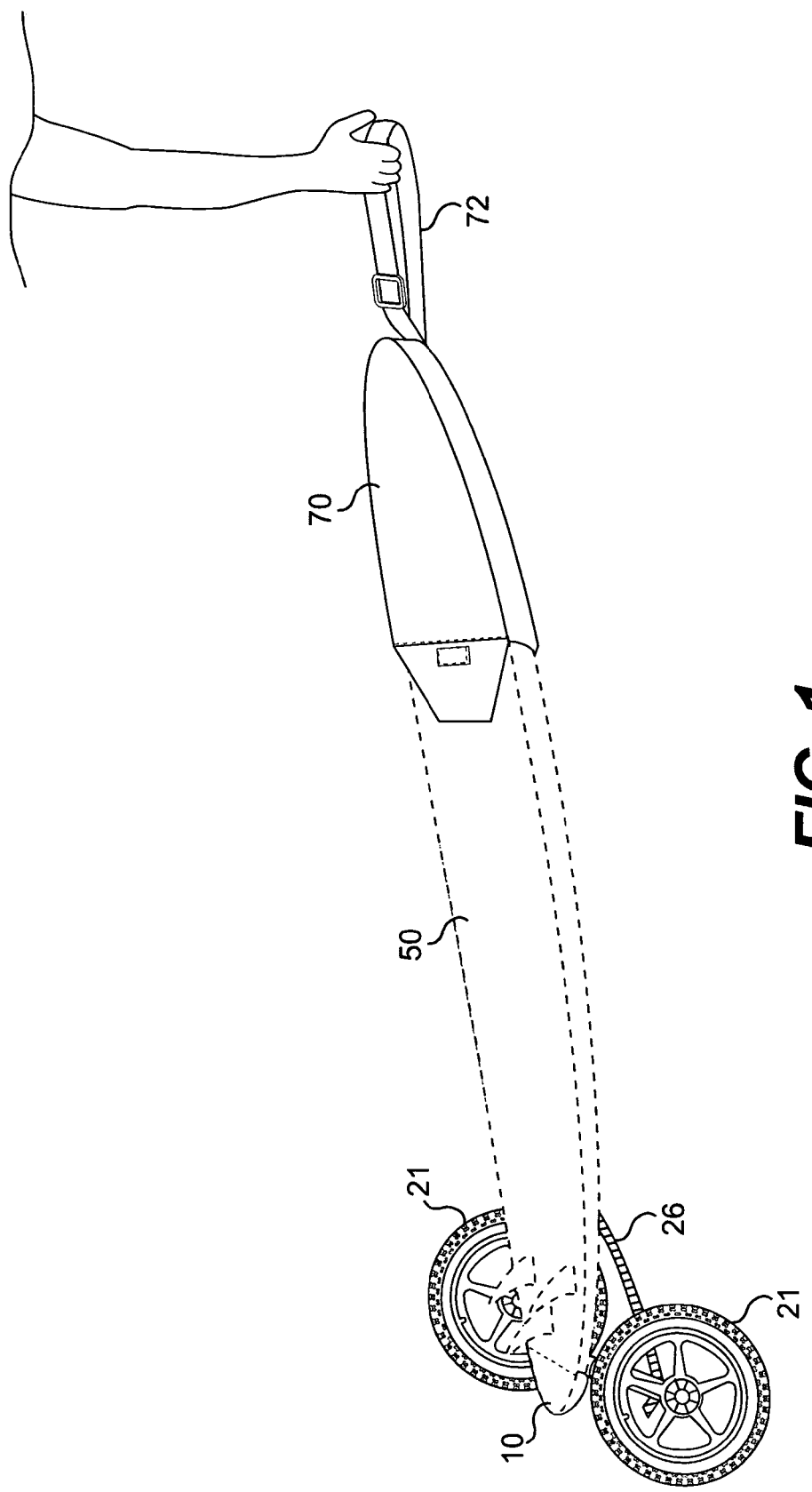
FIG. 1 is a perspective view of a preferred embodiment of the invention being ally towed.

ELEMENT LIST 10 tail piece
12 axle sleeve
20 wheel assembly
21 wheel
22 quick release mechanism
23 washer
24 axle
25 pipe
26 tensioner
26s tensioner center strap
26a first tensioner arm
26b second tensioner arm
26c tensioner connector
26d tensioning device
30 automobile roof rack
31 front transverse rail of automobile roof rack
32 rear transverse rail of automobile roof rack
40 equipment transport system
41 container for equipment transport system in kit form
50 equipment
60 roof rack mount
70 head piece
72 handle
73 head piece connector

DETAILED DESCRIPTION OF THE PREFERRED EMBODIMENT

The present invention is an equipment transport system capable of being provided in kit form. The transport system is easily assembled or disassembled, to enhance portability. In various forms, the system may transport equipment by hand, towed from a vehicle (e.g., bicycle), or mounted onto an automobile roof rack. The system uses the rigidity of the transported equipment as the structure for lightweight and manageable transportation. The term rigid in reference to equipment is intended to encompass all types of equipment that are not so flexible as to sag to the ground over the course of its length during transportation. Those skilled in the art will readily see that wheel diameter or other aspects of the invention may be altered to accommodate some flexible items that might risk sagging in certain applications. Alternatively, if transportation of non-rigid equipment is desired, then the present invention may require some additional supporting structure, which will be apparent in the description below.

In general, equipment simply refers to implements or items desired to be transported for some purpose, operation, or activity. The types of rigid items or equipment suitable for transportation by the present invention are widely variable. As discussed above, some of these items, such as surfboards, kayaks, or canoes, may be awkward or elongated, and clearly difficult to transport. For use with the present invention, the equipment should generally have at least two ends that are capable of fitting into the enclosure or pockets of the present invention; these two ends are referred to as a front end and a rear end for convenience and not directional limitation.

The present invention may be configured for a specific class of equipment or configured in a generic manner for a range of equipment or items. For example, one embodiment of the present invention may be tailored to accept and transport surf boards. Another embodiment of the present invention may be directed to kayaks. This tailoring can enhance the performance of the transport system, as further described below. However, the present invention is also contemplated as being provided in a general or utility embodiment with pocket size determined by a generic volume appropriate to the contemplated uses. The invention may thus be adapted for transporting a wide variety of rigid items, such as lumber, wind surfers, tents, ice chests, beach umbrellas, yard tools, ladders, etc.

With reference to the drawings, an embodiment of the present invention 40 assembled and being used manually to tow equipment 50 is illustrated in FIG. 1. Major items shown in FIG. 1 include head piece 70, tail piece 10, two wheels 21, and a portion of tensioner 26. Tail piece 10 and head piece 70 may be manufactured from a durable, lightweight fabric, screen, nylon, mesh, rubber, neoprene, cloth, or other pliable material known to those in the art. Head piece 70 and tail piece 10 are shaped to define pockets or enclosures for insertion of equipment 50. As shown, rear end of equipment 50 may be inserted into tail piece 10, and front end of equipment 50 may be inserted into head piece 70. In general, tensioner 26 operates to draw a tension between head piece 70 and tail piece 10, so that the resistance or rigidity of the equipment 50 provides structure for the transport system. As noted above, tail piece 10 and head piece 70 may be tailored to fit about the equipment 50 to be transported; this embodiment is tailored for a surf board. As shown, tail piece 10 may be tailored to avoid any obstructions typical for a class of equipment 50, such as the fins on a surf board, but large enough to grip equipment 50 securely.

In use, the forces arising from towing are distributed by head piece 70 and tail piece 10 over the corresponding enclosed surface areas of equipment 50. As noted above, head piece 70 and tail piece 10 may be tailored or fitted to create pockets or enclosures specific to a single type of equipment 50; this may provide more secure seating and effective distribution of forces, but it may also limit the ability to accommodate other types of equipment 50. However, if head piece 70 and tail piece 10 are created from a pliable fabric, then these pieces may simply be sized to form generic pockets or enclosures that are large enough to accommodate the desired types of equipment, and excess fabric will typically collapse around the equipment when tensioner 26 draws a tension.

Figure 2:
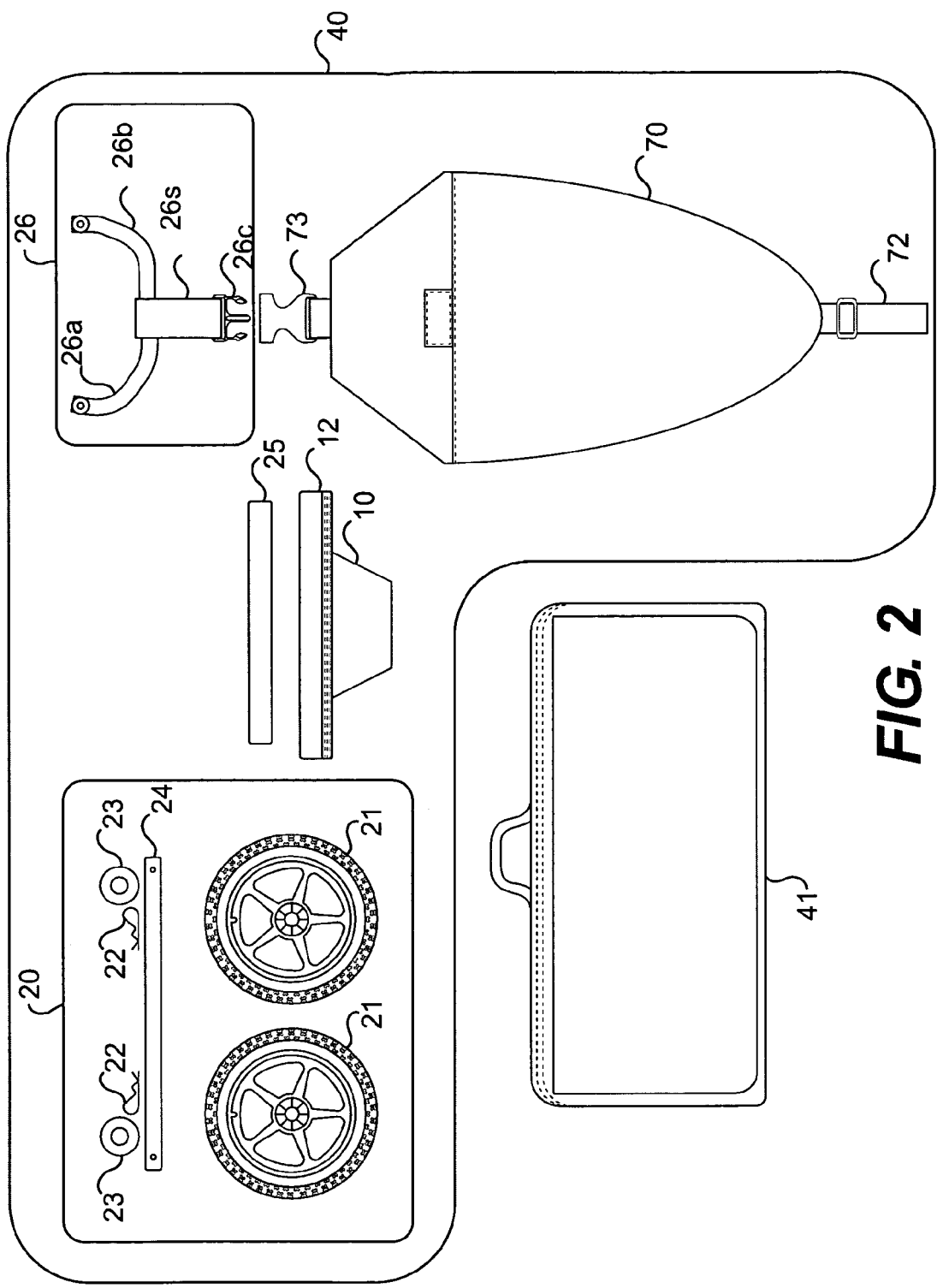
FIG. 2 is a view of the invention as a kit of its constituent components.

FIG. 2 illustrates the components of the equipment transport system 40 in kit form. Tail piece 10 is adapted to mount and bear a wheel assembly 20 in a substantially transverse orientation to the direction of motion. In this example, tail piece 10 includes axle sleeve 12, which is adapted to receive and support optional pipe 25 and axle 24 of wheel assembly 20. Axle sleeve 12 is long enough to provide effective support to wheel assembly 20, but shorter than axle 24 so that wheels 21, 21 may be detachably mounted onto exposed ends of axle 24. For this embodiment, wheel assembly 20 includes axle 24, wheels 21, 21, and a quick release mechanism 22, such as a cotter pin, with protective washer 23 for each end of axle 24. Optional pipe 25 is preferably a lightweight and durable rigid material, such as PVC. Pipe 25 slides into axle sleeve 12 of tailpiece 10; axle 24 may then be placed inside pipe 25, such that optional pipe 25 operates as a housing or bushing for axle 24 and prevents wear of axle sleeve 12. Those skilled in the art will readily see that wheel assembly 20 and the means for mounting wheel assembly 20 to tail piece 10 may take any one of a variety of configurations while still preserving the portability and light weight characteristics of the invention. Examples of configurations other than axle sleeve 12 for axle 24 may include plastic or metal bearings mounted onto plastic or rubber patches that are affixed or sewn to tail piece 10; similarly attached clips, detents, snap lock fittings, or other equivalent mechanisms to grip axle 24 may also be used. Alternative configurations of cloth mounts for axle 24 may be strap supports, hook and loop or zipper fastened enclosures, etc. Axle 24 may rotate within sleeve 12 or optional pipe 25 during transportation, or may be stationary with wheels 21, 21 rotatably mounted onto axle 24.

Figure 3:
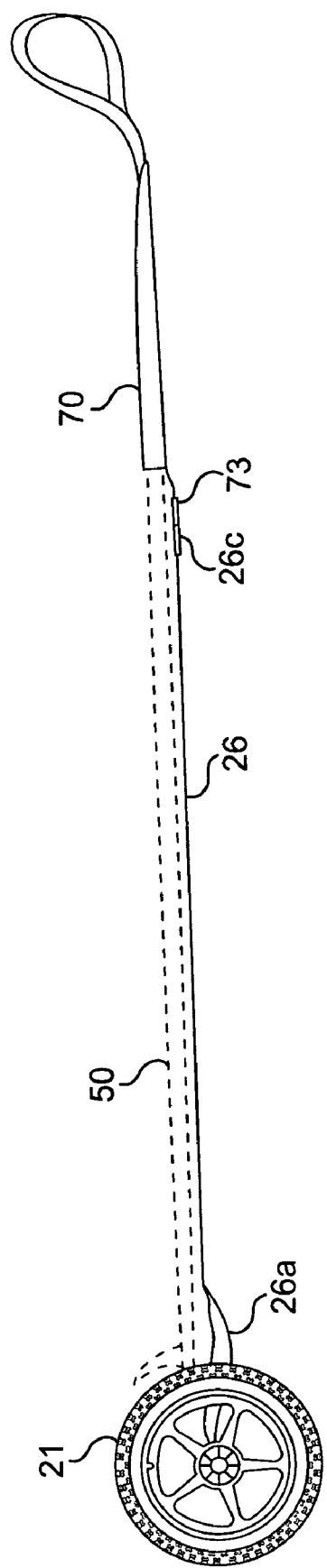
FIG. 3 is a side view of the invention.

FIG. 3 is a side view of transport system 40, which reveals tensioner 26 drawing a tension between head piece 70 and tail piece 10 (obscured by wheel 21). In simple embodiments, tensioner 26 may be an elastic or adjustable tie or strap capable of being fastened to tail piece 10 and head piece 70, and equipped to draw a tension between the two pieces. Tensioner 26 is preferably constructed of durable and lightweight strapping material, such as cloth, leather, heavy duty rubber, or elastic cord, or some combination thereof. However, tensioner 26 may be comprised of other materials that are sufficiently durable, pliable, and well suited to create and withstand tensioning.

Figure 4:
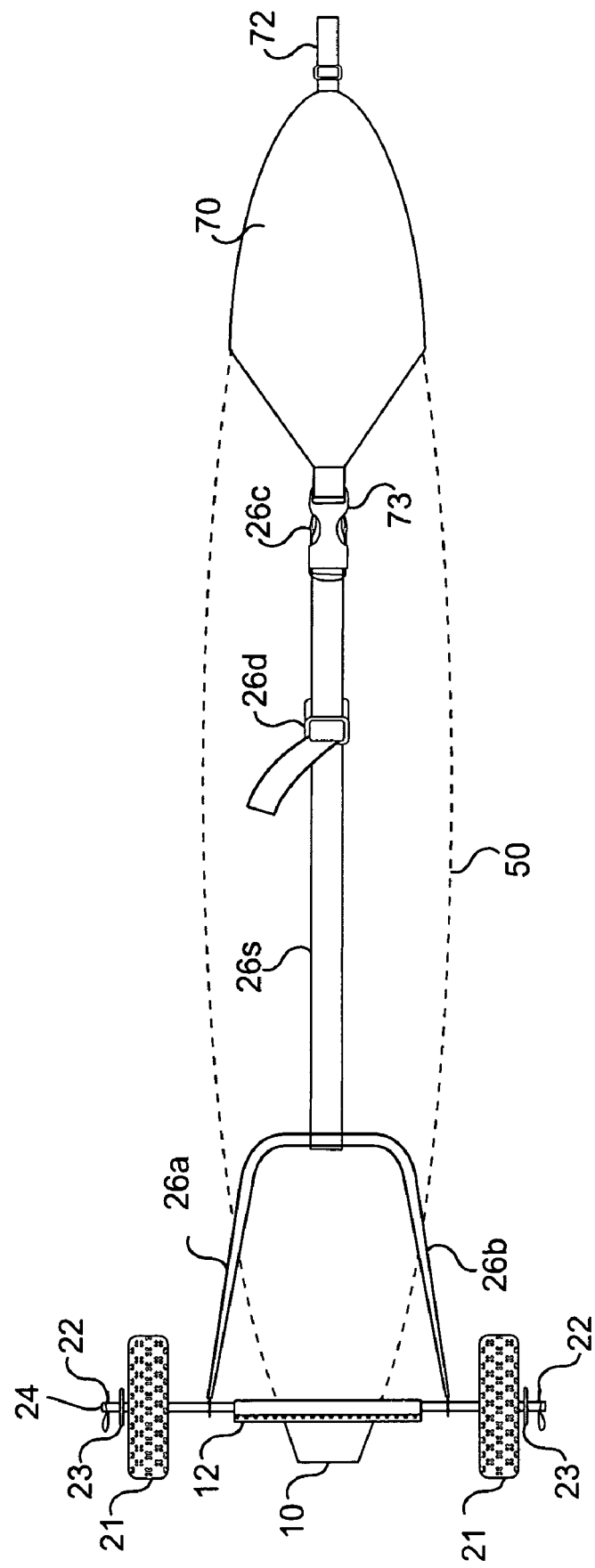
FIG. 4 is a bottom view of the invention.

With reference to FIG. 4, tensioner 26 includes tensioner device 26d, which may be such tensioning mechanisms known to the art, such as elastic strapping material, adjustable buckles or turnbuckles, strap tighteners, cinches, ratchets, cams, winches, springs, tension levers, clamps, hydraulic cylinders, rotating shafts, etc. The shape or configuration of tensioner 26 may be any that effects the purpose described herein, as will be apparent to those skilled in the art. As may be seen in this embodiment, tensioner 26 may draw a tension between head piece 70 and tail piece 10, while also serving the beneficial function of a strut or lateral support for axle 24. For this example, tensioner 26 is a strap assembly having at least three strap ends: center strap 26s and arms 26a and 26b. Center strap 26s is adapted to be fastened to head piece 70. As may be seen in FIG. 5, arms 26a and 26b of tensioner 26 may provide openings for insertion of the ends of axle 24; these openings are preferably protected from wear, as with grommets or other means known to those skilled in the art. During assembly of the kit, axle strap 26 is oriented such that center strap 26s points toward head piece 70 and away from axle 24. Openings in arms 26a and 26b are placed over the right and left portions of axle 24, inside or prior to mounting wheels 21, 21, but outside axle sleeve 12. Preferably, the diameter of openings in arms 26a and 26b are sized to be smaller than the diameter of pipe 25, but larger than axle 24. The length of pipe 25 may be optimized to create desired angles in the arms of the tensioner 26 so that arms 26a and 26b act as effective struts or lateral supports when center strap 26s is placed under tension. FIG. 4 illustrates this with a bottom view of an embodiment of the invention. As shown, tension device 26d may be an adjustable buckle by which a manual tension may be placed on tensioner 26. When tensioner 26 draws a tension, it may assume a Y shape as arms 26a and 26b draw against axle 24 and center strap 26s draws against head piece 70. For this arrangement, tension is imparted to tail piece 10 by way of mounted axle 24. If tensioner 26 is fabricated from a material that is less pliable, then the shape of tensioner 26 may be modified to achieve a Y or U shape even without tension if such balanced struts or lateral supports are desired. Thus, after arms 26a and 26b are connected to axle 24, center strap 26s is attached to head piece 70 and a tension is drawn between head piece 70 and tail piece 10 by way of axle 24.

Wheels 21, 21 are detachably mounted at each end of axle 24, preferably using a quick-release mechanism 22 or similar disconnect arrangement known to those skilled in the art, such as lynch pins, wheel locks, threaded caps, cotter pins, detents, etc., to permit rapid assembly or disassembly. The design of wheels 21, 21 may be either multi-purpose or targeted to a particular environment, such as sand tires for beach uses. Washers 23, 23, or other separating means, may be positioned on axle 24 between each wheel 21 and the associated quick release mechanism 22 to protect such mechanism.

Figure 5:
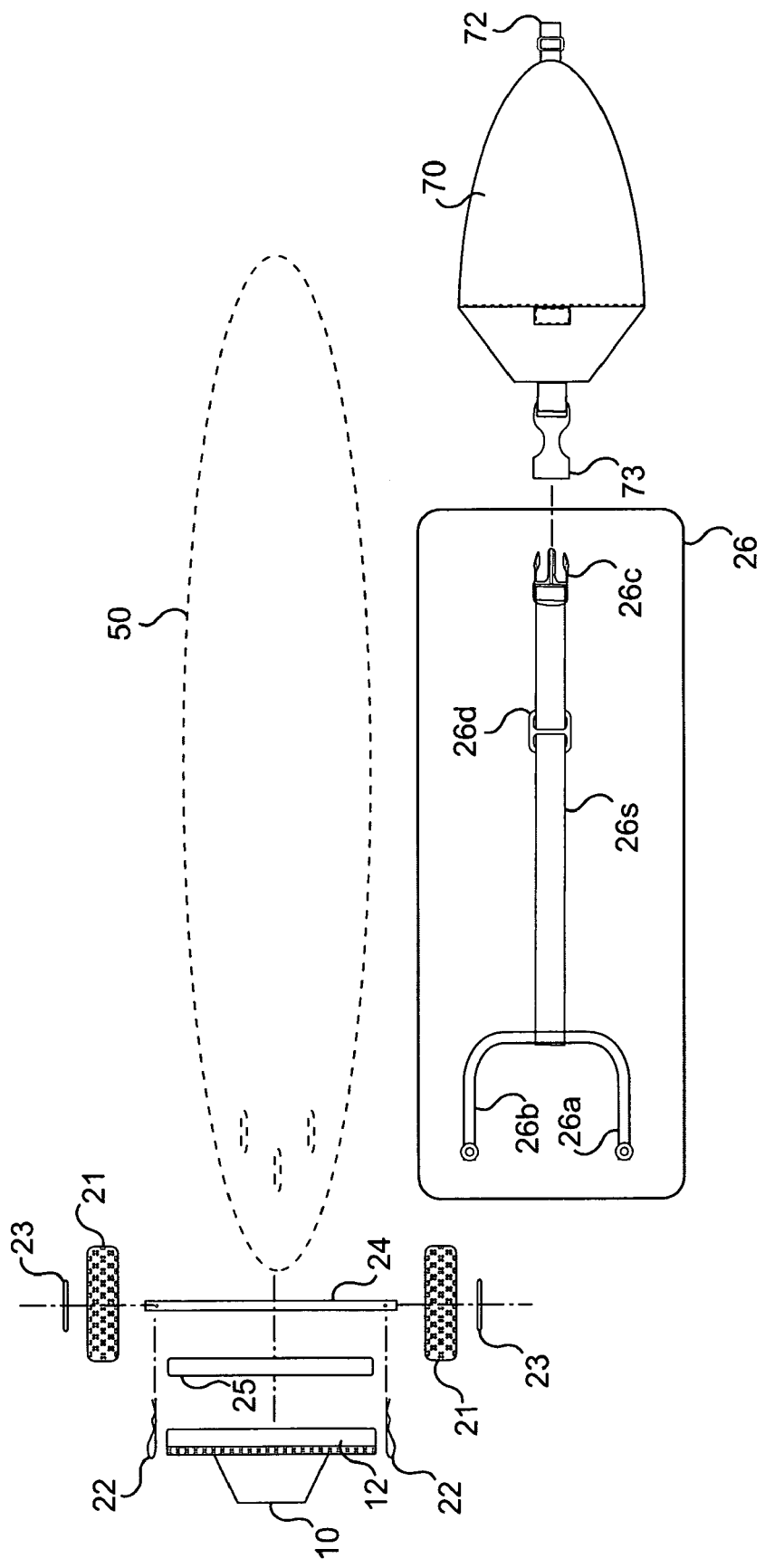
FIG. 5 is an exploded view of the invention.

Some features of the front or head components may be seen in FIG. 5. Head piece 70 defines an enclosure to receive a front end or head of equipment 50. Head piece 70 may provide an optional buckle, tie, or other mating connector 73 with which center strap 26s of tensioner 26 may fasten, shown here by connector 26c. Alternatively, center strap 26s may include a jaw clip, hook and loop, or other connector (not shown) for attaching to the material of head piece 70 as well as tail piece 10. Thus, center strap 26s of tensioner 26 may be fastened to headpiece 70 by connector 73 and tensioner connector 26c, or other such means known in the art.

As shown in FIG. 5, tensioning device 26d is incorporated into center strap 26s to exert a force that pulls headpiece 70 and axle assembly 20, mounted on tail piece 10, together. In this case, tensioning device 26d is an adjustable buckle incorporated into center strap 26s of tensioner 26. As discussed above, the tension force causes equipment 50 to seat more snugly into the enclosures of tail piece 10 and head piece 70. That is, when strap 26s is tightened, it causes head piece 70 and tail piece 10 to move together, gripping more securely about equipment 50, causing the whole unit to become rigid. Those skilled in the art may contemplate a variety ways or configurations to create such a seating force; as noted above.

Figure 6:
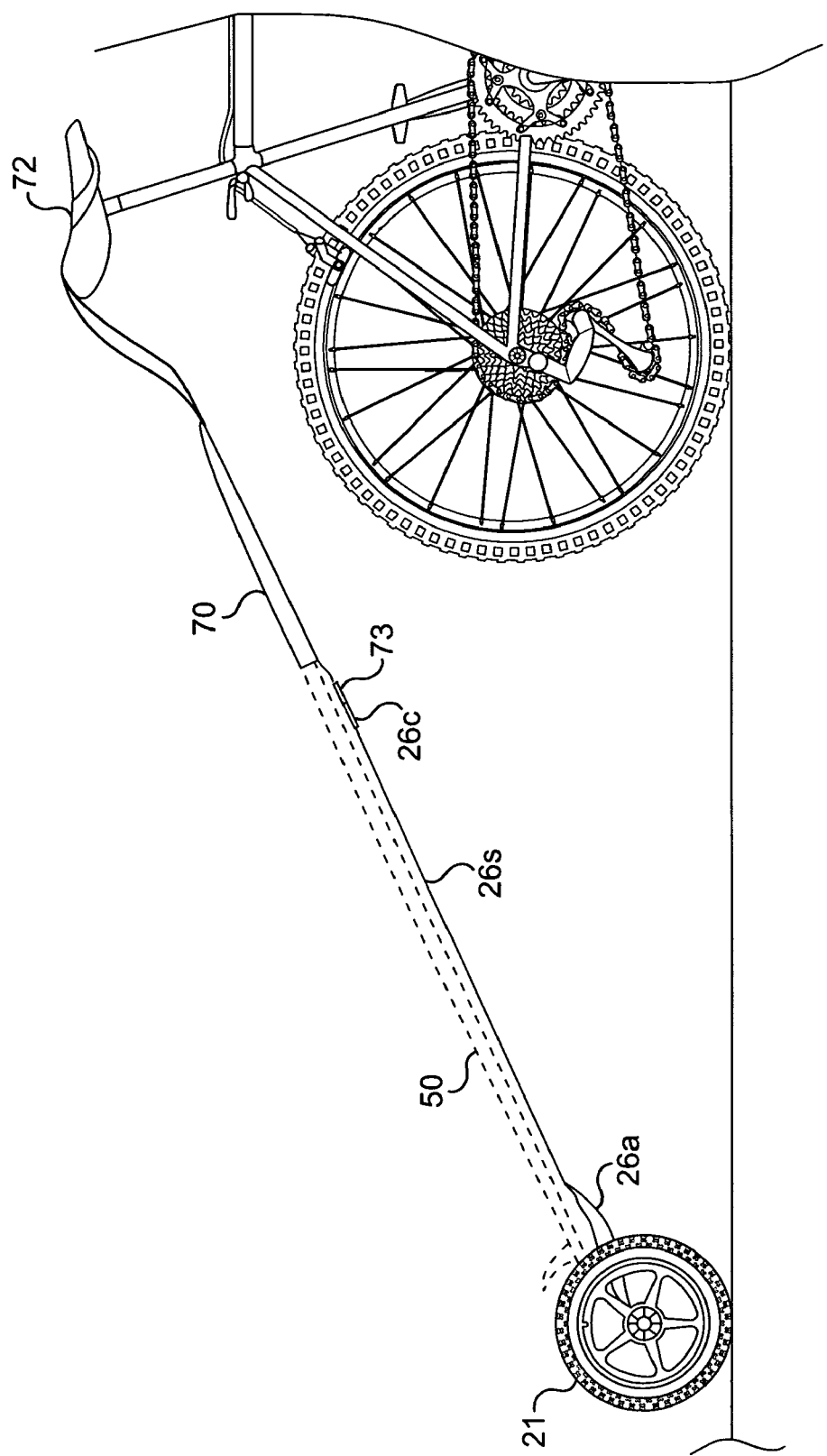
FIG. 6 is a view of a preferred embodiment of the invention set up for towing by cycle.

In a typical embodiment, head piece 70 features handle 72. Handle 72 might be a simple loop of strap material, or other means suitable for carrying, steering, and/or pulling equipment 50. Handle 72 may also be a loop sized such that it can be both securely wrapped about an average beach bicycle seat, as shown in FIG. 6, or gripped by hand. The pocketed design of tail piece 10 and head piece 70 enables a greater distribution area for the distribution of forces, enhancing maneuverability and control. Alternatively, handle 72 may include an adaptor to affixing the transport system to a trailer hitch, seats or other appropriate features on motorcycles, all terrain vehicles, etc.

Figure 7:
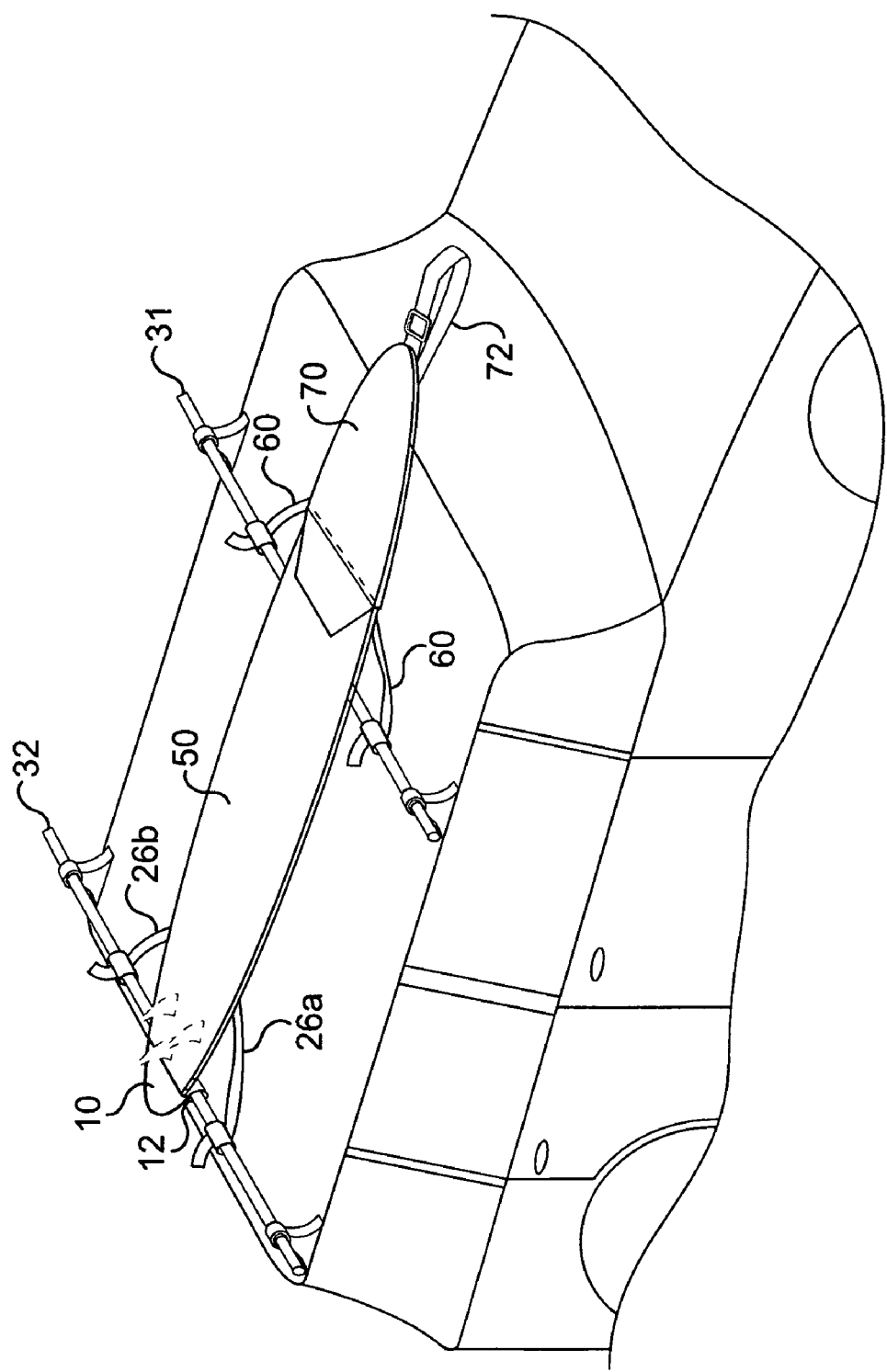
FIG. 7 is a view of a preferred embodiment of the invention in use on an mobile roof rack.

In another typical embodiment, the transport system 40 may be adapted to mounting onto an automobile roof rack 30. As shown in FIG. 7, for one such embodiment tail piece 10 provides axle sleeve 12 that is adapted to receive rear transverse rail 32 of roof rack 30. Head piece 70 may include roof rack mounts 60, 60 for fastening head piece 70 to a front transverse rail 31 of a roof rack 30. Tensioner 26 may be adapted (e.g., 26a and 26b may include hook and loop fasteners, as with mounts 60) for mounting and drawing a tension between rear transverse rail 32 (in a manner analogous to axle 24) and head piece 70, as shown in FIG. 7. Alternatively both head piece 70 and tail piece 10 may each include a plurality of mounts 60 for fastening to roof rack 30. Mounts 60 may take a variety of forms known to those in the art; in a simple embodiment, mounts 60 may be straps with hook and loop fasteners for wrapping and securing transport system 40 to roof rack 30. Depending on the application, mounts 60 may also be gripping clips, custom fasteners, clamps, adjustable strap loops, etc. for attaching to transverse rails 31 and 32; if required by the application, mount 60 may include strap extensions for access to roof rack 30.

In summary, FIGS. 1, 3, 4, and 6 show an assembled equipment transport system 40. In particular, FIG. 4 illustrates an assembled embodiment from below. As center strap 26s is tightened, head piece 70 and tail piece 10 both grip equipment 50, which in this illustration is a long surf board. FIG. 2 depicts the components in kit form. Wheel assembly 20, along with optional pipe 25, are the components of the invention with the greatest bulk or rigidity; thus, the present invention 40 is capable of being disassembled easily, packed into compact container 41, and readily transported or sold as a kit. FIG. 5 is an exploded view of the components. FIG. 7 depicts how equipment transport system 40 may be adapted for use with roof rack 30.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A kit for transporting rigid equipment having a front and a rear end, said kit comprising:
   an axle;
   a plurality of wheels capable of being mounted onto said axle;
   a first piece having an enclosure for insertion of the front end of the equipment;
   a second piece having an enclosure for insertion and support of the rear end of the equipment, and further having a mount capable of bearing the axle in a substantially transverse orientation to a direction of transportation;
   a tensioner capable of fastening to the first piece, fastening to the second piece, and creating a tension between the first and second pieces so as to seat the front end of the equipment within the enclosure of the first piece and the rear end of the equipment within the enclosure of the second piece; and wherein said tensioner comprises a strap assembly having a means for tensioning said strap assembly and at least three strap ends including a connecting strap end having a fastener capable of fastening to the first piece, a first strut end having an orifice capable of slideably receiving a first end of the axle, and a second strut end having an orifice capable of slideably receiving a second end of the axle, such that the first and the second strut ends are capable of fastening to the second piece by attachment to the axle when the axle is mounted on the second piece.

2. The kit for transporting equipment according to claim 1, wherein on the second piece, the mount for bearing the axle in a substantially transverse orientation is an axle sleeve for insertion and bearing of the axle, and wherein the axle sleeve has a length that permits mounting of the plurality of wheels onto the axle when the axle is inserted into the axle sleeve so that the axle and plurality of wheels support the second piece.

3. The kit for transporting equipment according to claim 1, wherein the first piece includes a handle.

4. The kit for transporting equipment according to claim 1, wherein the first piece includes an adapter for attachment to a towing vehicle.

5. The kit for transporting equipment according to claim 1, wherein the first and second pieces are made of a pliable fabric.

6. The kit for transporting equipment according to claim 1,
wherein on the second piece, the mount for bearing the axle in a substantially transverse orientation is an axle sleeve for insertion and bearing of the axle, and wherein the axle sleeve has a length that permits mounting of the plurality of wheels onto the axle when the axle is inserted into the axle sleeve so that the axle and plurality of wheels support the second piece; and
wherein the kit further comprises a pipe configured to be inserted into the axle sleeve of the second piece and to separate the axle from the axle sleeve when the axle is inserted into the axle sleeve.

7. An equipment transport system for transporting rigid equipment having a front and rear end, said system comprising:
a wheel assembly;
a first piece having an enclosure for insertion of the front end of the equipment;
a second piece having an enclosure for insertion and support of the rear end of the equipment, and further having a mount supporting the wheel assembly in a substantially transverse orientation to a direction of transportation and wherein said wheel assembly supports the second piece;
a tensioner detachably fastened to the first piece, detachably fastened to the second piece, and capable of creating a tension between said first and second pieces so as to seat the front end of the equipment within the enclosure of the first piece and the rear end of the equipment within the enclosure of the second piecer: and wherein
said wheel assembly comprises an axle and a plurality of wheels detachably mounted onto said axle; and
said tensioner comprises a strap assembly having a means for tensioning said strap assembly and at least three strap ends including a connecting strap end detachably fastened to the first piece, a first strut end having an orifice slideably receiving a first end of the axle, and a second strut end having an orifice slideably receiving a second end of the axle, such that the first and second strut ends detachably fasten to the second piece by attachment to the axle when the axle is mounted on the second piece.

8. The system for transporting rigid equipment according to claim 7, wherein the first piece includes a handle.

9. The system for transporting rigid equipment according to claim 7, wherein the first piece includes an adapter for attachment to a towing vehicle.

10. The system for transporting rigid equipment according to claim 7, wherein the first and second pieces are made of a pliable fabric.

11. A kit capable of being used to transport rigid equipment by wheel or by mounting onto an automobile roof rack having at least a first and second transverse rails, where such equipment has a front and a rear end, said kit comprising:
a first piece having an enclosure for insertion of the front end of the equipment and a means for mounting onto the first transverse rail of the automobile roof rack;
a second piece having an enclosure for insertion and support of the rear end of the equipment and a means for mounting onto the second transverse rail of said automobile roof rack;
a wheel assembly capable of detachably affixing to the second piece in a substantially transverse orientation to a direction of transportation and supporting the second piece during wheeled transportation;
a tensioner capable of fastening to the first piece, fastening to the second piece, and creating a tension between the first and second pieces so as to seat the front end of the equipment within the enclosure of the first piece and the rear end of the equipment within the enclosure of the second piece; wherein
said wheel assembly comprises
an axle;
a plurality of wheels capable of being mounted onto said axle;
said second piece further includes an axle sleeve adapted to the insertion and bearing of the axle in a substantially transverse orientation to a direction of transportation, wherein the length of the axle sleeve is adapted to permit mounting of the plurality of wheels onto the axle when the axle is inserted into the axle sleeve so that the axle and plurality of wheels may support the second piece during wheeled transportation; and
wherein said tensioner comprises a strap assembly having a means for tensioning said strap assembly and at least three strap ends including a connecting strap end having a fastener capable of fastening to the first piece, a first strut end having an orifice capable of slideably receiving a first end of the axle, and a second strut end having an orifice capable of slideably receiving a second end of the axle, such that the first and the second strut ends are capable of fastening to the second piece by attachment to the axle when the axle is mounted on the second piece.

12. The kit for transporting equipment according to claim 11, wherein:
said kit further comprises a pipe configured to be inserted into the axle sleeve of the second piece and to separate the axle from the axle sleeve when the axle is inserted into the axle sleeve.

* * * * *